Patented Oct. 22, 1940

2,218,704

UNITED STATES PATENT OFFICE 2,218,704

TITANIUM PIGMENT PRODUCTION

Archibald M. Erskine, Chatham, N. J., assignor to E. I. du Pont de Nemours & Company, Wilmington, Del., a corporation of Delaware No Drawing. Application July 23, 1937, Serial No. 155,231

3 Claims. (Cl. 134—58)

This invention relates to improvements in the production of titanium pigments. More particularly, it has reference to the production of surface coated titanium pigments useful in printing ink formulations. Still more particularly, it has reference to the surface treatment of titanium pigments with titanium and zirconium hydroxides.

Titanium oxide pigments as normally produced have a high affinity for water, and in fact are more easily wetted by water than by organic liquids. This property is useful in some applications of the pigment, but in others it induces undesired results, particularly in instances of printing ink and lithographic varnish applications. Because of this property, titanium oxide has not been found particularly desirable or adapted for use in such fields.

The process of lithographic printing comprises, briefly, establishing the design to be printed in a medium easily wet by oil and not by water on the surface of the printing plate, which is itself wet preferentially by water. A roll containing aqueous fountain solution, or "etch," is passed over the plate, followed by an inking roll. The ink should adhere to the water-repellent design area only and may then be transferred onto paper directly or by means of an offset blanket. If the pigment in the ink is not completely water-repellent or is more readily wetted by water or the aqueous fountain solution with which it is in constant contact than by oil, an objectionable and pronounced thickening takes place with accompanied transfer or "bleeding" of the pigment from the oil into the separate water phase. This "breakdown" or bleeding into the water-wet portions of the plate or into the area wet by aqueous fountain solution creates an imperfect design when printed on paper. This thickening and bleeding phenomenon is known in the art as lithographic breakdown.

Titanium oxide pigments are readily wet by water and it is an object of the present invention to overcome the disadvantages arising by reason of titanium oxide use in the printing ink industry, as well as to widen its usage and adaptability to the production of inks of higher hiding power, such as is possible with this pigment. Another object of the invention is the production of a pigment which is readily adapted to grinding into a lithographic varnish and affords the production of a non-livering ink. A further object of the invention is the production of titanium oxide pigments useful for the production of inks which exhibit effective resistance towards lithographic breakdown.

Other objects and advantages will be apparent from the ensuing description of my invention, which broadly comprises surface treating titanium oxide suitable for use as a pigment with a hydrate or oxide of any of the metals of the first subgroup of group IV or the metals of group V of the periodic table of elements, the soluble salts of which are easily hydrolyzed in acid or alkaline solution and form insoluble, colorless, or white hydrous oxides.

In a more specific and preferred embodiment, my invention comprises surface treating titanium oxide with a hydrate or oxide of titanium or zirconium by adding a solution of titanium sulfate, titanium chloride, zirconium chloride, zirconium sulfate, or other soluble salt of either titanium or zirconium, to a slurry of titanium oxide and precipitating the hydroxide or hydrate by suitable means such as by an alkali hydroxide or other basic material. The treated titanium pigment is then washed to remove soluble salts and subjected to drying, after which it may be suitably dry ground or pulverized prior to use.

In order that the invention may be more clearly understood, the following specific examples are given, each being illustrative in character only and none to be considered as in any wise limiting the invention:

Example I

Twelve gallons of a titanium sulfate solution containing 50 grams of $TiO_2$ per liter were added to 150 gallons of a titanium oxide pigment suspension containing 200 grams of $TiO_2$ per liter. The solution was then neutralized with sodium carbonate and the product filtered, washed and dried at 130° C. The dry pigment was then disintegrated in a hammer type mill and tested for lithographic breakdown. In this test the formulation consisted of 45 parts by weight of pigment to 25 parts by weight of a transparent lithographic varnish. It showed excellent resistance to breakdown in contact with a typical aqueous fountain solution. The untreated control was less easily wetted by the varnish, showed bleeding and exhibited lithographic breakdown within a few minutes.

Example II

Example I was repeated except that titanium chloride was substituted for the sulfate. Subsequent testing showed that the improvement was equal to that of the previous example.

Example III

One liter of zirconium sulfate solution containing 20 grams of ZrO₂ per liter was added to 10 liters of a finely ground titanium oxide slurry containing 200 grams of TiO₂ per liter. Precipitation was effected by neutralization with ammonium hydroxide and the product washed and dried. It contained 1.5% ZrO₂ and showed a satisfactory resistance to lithographic breakdown whereas the untreated control was unsatisfactory.

While any calcined titanium pigment may be treated in accordance with my invention, I preferably employ a finely-ground product, such grinding operation being best conducted prior to the treatment here contemplated. A product ground in accordance with the process disclosed in United States Patent 1,937,037 is quite suitable for use in the invention, due to its freedom of coarse particles, which would be objectionable in the lithographic industry.

The amount of titanium or zirconium oxide necessary for surface treating the titanium pigment will be found to be relatively small, the oxide being preferably precipitated on an aqueous suspension of the pigment subsequent to its calcination, and the amount utilized being calculated as the percentage of TiO₂ or ZrO₂ precipitated on the titanium pigment. The percentage amount of treating agent necessary to obtain satisfactory lithographic breakdown need seldom be more than 2%, amounts as low as .2% giving decided beneficial effects. In the preferred embodiment of my invention, I employ an amount of TiO₂ or ZrO₂ ranging from 0.5% to 2.0%. If desired, larger amounts will be found quite satisfactory, and in some instances it may be desirable to employ amounts ranging to as high as 5.0% or more of the hydrate, calculated as TiO₂ or ZrO₂.

The amount of heat treatment to which the treated titanium pigment is subjected subsequent to precipitation must not approach pigment calcination conditions, due to the fact that the lithographic properties developed in the pigment may become lost due to excessive temperature conditions. Preferably, temperatures of a drying order, such as those below 200° C. and preferably less than 140° C., are suggested as more desirable for use in the invention and in order to obtain optimum benefits therefrom.

The reason for the surprisingly new and unexpected results arising by reason of the treatment afforded by my invention is not completely understood by me. The hydrated oxide of titanium or zirconium might be expected to be more easily wetted by water than the anhydrous oxide, but the opposite has been found to be the case in the present invention. It appears that a coating or precipitation of the hydrate or hydrous oxide occurs on the pigment particles, the presence of which, even in small percentage amounts, induces in the main pigment an easier wettability by oil in comparison with water, and in such state it appears able to absorb or form a union with the lithographic varnish or ink which is not easily broken by contact with the aqueous fountain solution.

As has been mentioned, treatment of the titanium pigment may be effected by the interaction of any soluble salt of titanium or zirconium with a neutralizing agent in the presence of the pigment. Useful neutralizing agents include the sulfides, hydroxides, and carbonates of sodium, potassium, calcium, barium, ammonium, etc., or equivalent agents. In combinations such as titanium sulfate or zirconium sulfate and barium hydrate, insoluble barium sulfate will be precipitated along with the titanium hydrate. When employing titanium chloride with the same base, a soluble salt is formed. The pigment properties in such cases are essentially the same, except that one pigment is diluted with a small amount of blanc fixe and the other is contaminated with barium chloride, unless washing is resorted to. In instances where soluble salts are among the products of reaction present in the treated pigment, washing of such pigment will be found desirable.

While precipitation of the titanium or zirconium hydrate in the presence of the pigment being treated is preferred, it is obvious that similar results are obtainable by separately preparing the hydrate suspension and subsequently adding or incorporating the same in the pigment when in slurry form. Accordingly, this method of incorporating the treating agent in the titanium pigment is contemplated as within the scope of my invention.

While, as indicated above, the soluble salts of titanium and zirconium are particularly adapted for use in the invention, it is obvious that the soluble salts of other metals, and particularly those remaining in the first sub-group of group IV and group V of the periodic table of elements which are easily hydrolyzed in acid or alkaline solutions and form insoluble, white or colorless hydrous oxides, may be also utilized herein. Specifically, these include the soluble salts of hafnium thorium, columbium, tantalum, antimony and bismuth, examples of which include sodium columbate, sodium tantalate, antimony trichloride, thorium nitrate, bismuth nitrate, or their sulfates, etc.

Any of the soluble salts contemplated in the invention may be independently employed or any desired mixture or combination of the same may be utilized. Generally, the amount of soluble salt employed is subject to variance and may range from substantially .2% to 5% (calculated as the oxide of the metal or metals employed), based on the weight of the pigment. It will be understood, of course, that the amounts employable may vary and will depend upon physical or other characteristics desired in the resultant pigment. If desired, the amount of addition agent or mixtures of the same associated with the pigment may range to as high as substantially 10%, based on the weight of the pigment and calculated as the oxide of the metal or metals employed.

While the treatment of titanium oxide pigments contemplated and proposed herein effectively eliminates lithographic breakdown, other distinctive advantages are simultaneously afforded and obtained by my novel treating agents. For instance, the treated pigment becomes more readily wetted by the varnish and will inhibit any tendency of the varnish or ink to gel or body to a relatively hard, non-fluid mass; nor will the same liver or thicken on standing. This is a common disadvantage of a number of pigments commonly employed in coating composition formulations. Additionally, my novel treating agents increase the chalk resistance characteristics of the resultant pigments, rendering them particularly adapted in pigment applications where this property is desirable and essential.

The term "titanium pigment," as here used and in the appended claims, has reference to pure, calcined titanium oxide, as well as to titanium oxide admixed with well-known extenders, such as barium sulfate, calcium sulfate, asbestine, etc.

I claim as my invention:

1. A process for producing a titanium oxide pigment stable and resistant towards lithographic breakdown which comprises precipitating upon said pigment, and subsequent to calcination thereof, from about .2% to 2% of hydrous titanium oxide and thereafter drying the treated pigment at a temperature not exceeding substantially 200° C.

2. A process for producing a titanium oxide pigment stable and resistant towards lithographic breakdown, which comprises reacting in the presence of a previously calcined form of said pigment a soluble salt of titanium with a basic neutralizing agent to precipitate a relatively small amount of titanium oxide on said pigment and then drying the resulting product at a temperature below substantially 200° C.

3. As a new pigment composition stable and resistant towards lithographic breakdown, calcined pigment titanium oxide containing from about .2% to 2% of precipitated hydrous titanium oxide associated with said pigment subsequent to calcination.

ARCHIBALD M. ERSKINE.